(12) United States Patent
Shirakawa et al.

(10) Patent No.: US 12,227,683 B2
(45) Date of Patent: Feb. 18, 2025

(54) CONNECTOR PRODUCTION METHOD AND ADHESIVE FILM

(71) Applicant: Resonac Corporation, Tokyo (JP)

(72) Inventors: Tetsuyuki Shirakawa, Tokyo (JP); Hiroyuki Izawa, Tokyo (JP); Takuya Mori, Tokyo (JP); Kenta Kikuchi, Tokyo (JP)

( * ) Notice: Subject to any disclaimer, the term of this patent is extended or adjusted under 35 U.S.C. 154(b) by 307 days.

(21) Appl. No.: 17/781,729

(22) PCT Filed: Dec. 3, 2020

(86) PCT No.: PCT/JP2020/045075
§ 371 (c)(1),
(2) Date: Jun. 2, 2022

(87) PCT Pub. No.: WO2021/112188
PCT Pub. Date: Jun. 10, 2021

(65) Prior Publication Data
US 2023/0002644 A1    Jan. 5, 2023

(30) Foreign Application Priority Data
Dec. 6, 2019 (JP) .................................. 2019-221309

(51) Int. Cl.
*C09J 7/38*     (2018.01)
*C09J 9/02*     (2006.01)

(52) U.S. Cl.
CPC . *C09J 7/38* (2018.01); *C09J 9/02* (2013.01); *C09J 2203/326* (2013.01);
(Continued)

(58) Field of Classification Search
CPC . C09J 7/38; C09J 9/02; C09J 2203/326; C09J 2301/302; C09J 2301/314; C09J 2301/408
See application file for complete search history.

(56) References Cited

FOREIGN PATENT DOCUMENTS

| CN | 109642130 | 4/2019 |
|---|---|---|
| CN | 110312772 | 10/2019 |

(Continued)

OTHER PUBLICATIONS

International Search Report dated Feb. 16, 2021 for PCT/JP2020/045075.
(Continued)

*Primary Examiner* — Daniel Mcnally
(74) *Attorney, Agent, or Firm* — SOEI PATENT & LAW FIRM (57) ABSTRACT

A method of producing a connected body, containing: disposing an adhesive film between a first electronic member having a first electronic electrode and a second electronic member having a second electrode; and pressure-bonding the second electronic member to the first electronic member via the adhesive film so that the second electrode is electrically connected to the first electrode; wherein the first electronic member has an indented surface, the first electrode is provided in a depressed portion of the indented surface, the second electrode has a substantially flat surface having an area larger than an area of the first electrode, the adhesive film contains: first conductive particles that are dendritic conductive particles; and second conductive particles containing a non-conductive core and a conductive layer provided on the core, and the second conductive particles have an average particle diameter of not less than a depth of the depressed portion.

8 Claims, 3 Drawing Sheets

(52) U.S. Cl.
CPC .... *C09J 2301/302* (2020.08); *C09J 2301/314* (2020.08); *C09J 2301/408* (2020.08)

(56) References Cited

FOREIGN PATENT DOCUMENTS

| | | | | |
|---|---|---|---|---|
| JP | 2000-036515 | | 2/2000 | |
| JP | 2000036515 A | * | 2/2000 | |
| JP | 2013-182823 | | 9/2013 | |
| WO | 2018/043505 | | 3/2018 | |
| WO | WO-2018043505 A1 | * | 3/2018 | ............... C08K 7/06 |

OTHER PUBLICATIONS

International Preliminary Report on Patentability with Written Opinion dated Jun. 16, 2022 for PCT/JP2020/045075.

\* cited by examiner

CONNECTOR PRODUCTION METHOD AND ADHESIVE FILM

CROSS-REFERENCE TO RELATED APPLICATIONS

This application is a 35 U.S.C. § 371 national phase application of PCT/JP2020/045075, filed on Dec. 3, 2020, which claims priority to Japanese Patent Application No. 2019-221309, filed on Dec. 6, 2019.

TECHNICAL FIELD

The present invention relates to a method of producing a connected body and an adhesive film.

BACKGROUND ART

In recent years, various adhesives have been used in the fields of semiconductors, liquid crystal displays, and the like for fixing electronic components, connecting circuits, and the like. In these applications, higher integration density and higher fineness of electronic members such as electronic parts, circuits, and the like are progressed, and adhesives are required to have a higher level of performance. In addition, since the configuration of a suitable adhesive may vary depending on the electronic member to be connected, it is necessary to examine the adhesive in consideration of the configuration, characteristics, and the like of the electronic members.

For example, Patent Literature 1 discloses an anisotropic conductive adhesive containing a first conductive adhesive layer containing a binder resin and first conductive particles dispersed in the binder resin, and a second conductive adhesive layer laminated on one surface of the first conductive adhesive layer and containing second conductive particles having a particle diameter smaller than the particle diameter of the first conductive particles dispersed in the binder resin, for the purpose of providing a method for producing a connected body using an anisotropic conductive adhesive that ensures conductivity with respect to an electrode terminal having an oxide film formed on the surface thereof and also provides insulation between adjacent wirings, and an anisotropic conductive adhesive.

CITATION LIST

Patent Literature

Patent Literature 1: Japanese Unexamined Patent Publication No. 2013-182823

SUMMARY OF INVENTION

Technical Problem

An object of the present invention is to obtain a connected body having excellent appearance and low resistance when an electronic member having a flat electrode is connected to an electronic member having an indented surface and an electrode provided in a depressed portion of the indented surface.

Solution to Problem

According to the study of the present inventors, when an electronic member having a flat electrode is connected to an electronic member having an indented surface and an electrode provided in a depressed portion of the indented surface, not every adhesive can necessarily suitably connect them. To solve the above problem, that is, to obtain a connected body having excellent appearance (specifically, suppressed generation of air bubbles in the depressed portion) and low resistance, it is necessary to use a specific adhesive. The appearance and resistance of the connected body referred to herein mean the appearance and resistance as initial characteristics immediately after the connected body is obtained.

One aspect of the present invention is a method of producing a connected body, containing a step of electrically connecting a first electronic member having a first electrode with a second electronic member having a second electrode via an adhesive film, wherein the first electronic member has an indented surface, the first electrode is provided in a depressed portion of the indented surface, the second electrode is an electrode having a substantially flat surface having an area larger than an area of the first electrode, the adhesive film contains: first conductive particles that are dendritic conductive particles; and second conductive particles that are conductive particles other than the first conductive particles, and each second conductive particle containing a non-conductive core and a conductive layer provided on the core, the second conductive particles have an average particle diameter of not less than a depth of the depressed portion, and the adhesive film is disposed between the first electronic member and the second electronic member, and the second electronic member is pressure-bonded to the first electronic member so that the substantially flat surface of the second electrode is electrically connected to the first electrode, in the step.

Another aspect of the present invention is an adhesive film containing: first conductive particles that are dendritic conductive particles; and second conductive particles that are conductive particles other than the first conductive particles, and each second conductive particle containing a non-conductive core and a conductive layer provided on the core, wherein the adhesive film is used for electrical connection of a first electronic member having a first electrode and a second electronic member having a second electrode, the first electronic member has an indented surface, the first electrode is provided in a depressed portion of the indented surface, the second conductive particles have an average particle diameter of not less than a depth of the depressed portion, the second electrode is an electrode having a substantially flat surface having an area larger than an area of the first electrode, and the substantially flat surface of the second electrode is electrically connected to the first electrode in the electrical connection.

The adhesive film may have a thickness of 15 μm or more. The adhesive film has a thickness of not less than the depth of the depressed portion. The average particle diameter of the second conductive particles is less than or equal to 2.5 times the depth of the depressed portion. The adhesive film has a thickness of between 1.2 times and 2 times the average particle diameter of the second conductive particles.

Advantageous Effects of Invention

According to the present invention, it is possible to obtain a connected body having excellent appearance and low resistance when an electronic member having a flat electrode is connected to an electronic member having an indented surface and an electrode provided in a depressed portion of the indented surface.

DESCRIPTION OF EMBODIMENTS

Hereinafter, embodiments of the present invention will be described in detail with reference to the drawings in some cases. Note that the materials exemplified below may be used singly or in combination of two or more unless otherwise specified. When a plurality of substances corresponding to each component are present in the composition, the content of each component in the composition means the total amount of the plurality of substances present in the composition, unless otherwise specified. In addition, the numerical range indicated using "to" means a range including numerical values described before and after "to" as the minimum and maximum values, respectively. In the numerical ranges stepwise described in the present specification, the upper limit value or the lower limit value of the numerical range one step may be replaced with the upper limit value or the lower limit value of the numerical range in another step. In addition, in the numerical range described in the present specification, the upper limit value or the lower limit value of the numerical range may be replaced with a value shown in Examples. In addition, the upper limit value and the lower limit value described individually may be arbitrarily combined. In addition, "A or B" may include any one of A and B or may include both of A and B.

Figure 1:
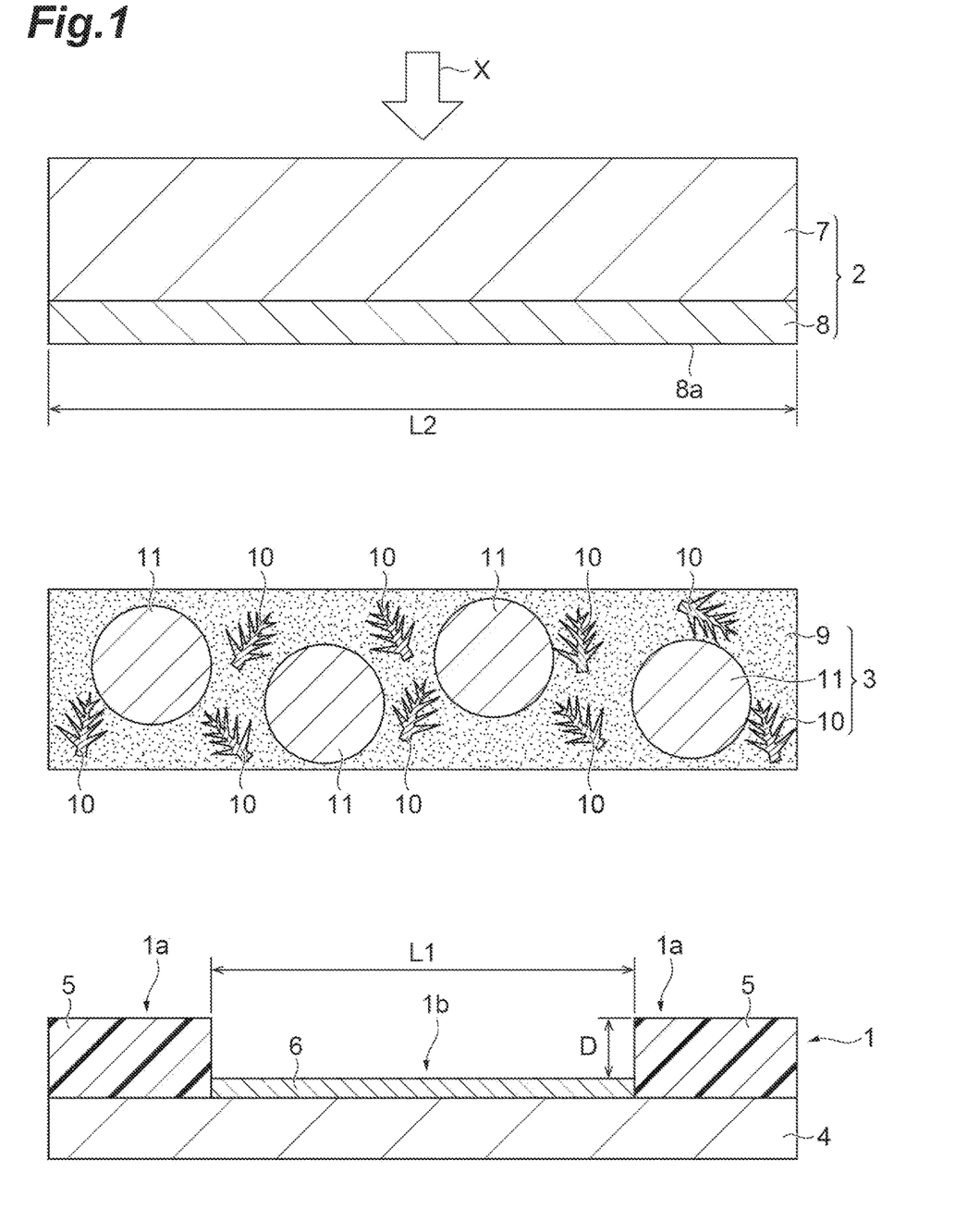
FIG. 1 is a schematic cross-sectional view showing an embodiment of a method of producing a connection body.

One embodiment of the present invention is a method of producing a connected body, containing a step (connecting step) of electrically connecting a first electronic member with a second electronic member via an adhesive film. FIG. 1 is a schematic cross-sectional view showing an embodiment of a method for producing a connected body. As shown in FIG. 1, in this producing method, a first electronic member 1, a second electronic member 2, and an adhesive film 3 are first prepared.

The first electronic member 1 contains a first substrate 4, an insulating layer 5 provided on one surface of the first substrate 4, and a first electrode 6. The surface of the first electronic member 1 (the surface on the side to be connected to the second electronic member 2) is an indented surface by the insulating layer 5. That is, in the first electronic member 1, the plurality of insulating layers 5 provided in a projected shape on the first substrate 4 constitute the projected portion 1a, and the plurality of insulating layers 5 are provided so as to be spaced apart from each other, whereby the gaps between the plurality of insulating layers 5 constitute the depressed portion 1b. The first electrode 6 is provided on a depressed portion 1b on the first substrate 4.

The length L1 of the depressed portion 1b (the length in a direction parallel to the surface of the first substrate 4 on which the insulating layer 5 and the first electrode 6 are provided) may be, for example, 25 µm or more and may be 3 mm or less. The depth D of the depressed portion 1b (a distance from the surface of the first electrode 6 to the upper surface of the insulating layer 5) may be, for example, 5 µm or more, 10 µm or more, 15 µm or more, 20 µm or more, or 25 µm or more, and may be 40 µm or less.

The first substrate 4 may be, for example, a substrate formed of glass, ceramic, polyimide, polycarbonate, polyester, polyethersulfone, or the like. The insulating layer 5 may be, for example, a layer formed of a solder resist or a coverlay. The first electrode 6 may be, for example, an electrode formed of gold, silver, copper, tin, aluminum, ruthenium, rhodium, palladium, osmium, iridium, platinum, indium tin oxide (ITO), or the like. The thickness of the first electrode 6 may be, for example, 5 µm or more, 10 µm or more, or 20 µm or more, and may be 200 µm or less, 100 µm or less, or 50 µm or less.

The second electronic member 2 contains a second substrate 7 and a second electrode 8 provided on one surface of the second substrate 7. The second substrate 7 may be, for example, a substrate formed of polyimide, polycarbonate, polyester, polyethersulfone, or the like. The second electrode 8 may be an electrode formed of gold, silver, copper, tin, aluminum, ruthenium, rhodium, palladium, osmium, iridium, platinum, indium tin oxide (ITO), or the like. The thickness of the second electrode 8 may be, for example, 5 µm or more, 10 µm or more, or 20 µm or more, and may be 200 µm or less, 100 µm or less, or 50 µm or less.

The second electrode 8 has a substantially flat surface 8a. The area of the substantially flat surface 8a of the second electrode 8 is larger than the area of the first electrode 6. That is, the length L2 of the substantially flat surface 8a of the second electrode 8 (the length in a direction parallel to the surface of the second substrate 7 on which the second electrode 8 is provided) is larger than the length L1 of the first electrode 6.

In one embodiment, the adhesive film 3 is formed of an adhesive layer containing an adhesive component 9, and first conductive particles 10 and second conductive particles 11 which are dispersed in the adhesive component 9.

The adhesive component 9 is composed of, for example, a material exhibiting curability by heat or light, and may be an epoxy type adhesive, a radically curable adhesive, and a thermoplastic adhesive containing polyurethane, polyvinyl ester or the like. Since the adhesive component 9 is excellent in heat resistance and moisture resistance after adhesion, the adhesive component may be composed of a crosslinkable material. The epoxy type adhesive contains an epoxy resin which is a thermosetting resin as a main component. The adhesive component 9 may be an epoxy type adhesive from the viewpoint that the epoxy type adhesive can be cured in a short time, has good connection workability, is excellent in adhesiveness, and the like. The radically curable adhesive has properties such as being excellent in curability at a low temperature in a short time as compared with the epoxy type adhesive, and is therefore suitably used according to the application.

The epoxy type adhesive contains, for example, an epoxy resin (thermosetting material) and a curing agent, and may further contain a thermoplastic resin, a coupling agent, a filler, and the like as necessary.

Examples of the epoxy resin include a bisphenol A type epoxy resin, a bisphenol F type epoxy resin, a bisphenol S type epoxy resin, a phenol novolak type epoxy resin, a cresol novolak type epoxy resin, a bisphenol A novolak type epoxy resin, a bisphenol F novolak type epoxy resin, an alicyclic epoxy resin, a glycidyl ester type epoxy resin, a glycidyl amine type epoxy resin, a hydantoin type epoxy resin, an isocyanurate type epoxy resin, and an aliphatic chain epoxy resin. These epoxy resins may be halogenated or hydrogenated, and may have a structure in which an acryloyl group or a methacryloyl group is added to a side chain. These epoxy resins are used singly or in combinations of two or more.

The curing agent is not particularly limited as long as the curing agent can cure the epoxy resin, and examples thereof include an anionic polymerization catalyst type curing agent, a cationic polymerization catalyst type curing agent, and a polyaddition type curing agent. The curing agent may be an anionic or cationic polymerization catalyst type curing agent from the viewpoint of excellent fast curability and no need for chemical equivalent consideration.

Examples of the anionic or cationic polymerization catalyst type curing agent may include an imidazole, a hydrazide, a boron trifluoride-amine complex, an onium salt (aromatic sulfonium salt, aromatic diazonium salt, aliphatic sulfonium salt, and the like), an amine imide, a diaminomaleonitrile, a melamine and its derivatives, a polyamine salt, a dicyandiamide, and these modified products. Examples of the polyaddition type curing agent include a polyamine, a polymercaptan, a polyphenol, and an acid anhydride.

These curing agents may be latent curing agents that are microencapsulated by being coated with polymer substances such as polyurethanes and polyesters, metal thin films of nickel, copper, and the like, inorganic substances such as calcium silicate, from the viewpoint of extending the pot life. The curing agents are used singly or in combinations of two or more.

The content of the curing agent may be 0.05 to 20 parts by mass with respect to 100 parts by mass of the total amount of the thermosetting material and the thermoplastic resin added as necessary.

A radically curable adhesive contains, for example, a radical polymerizable material and a radical polymerization initiator (also referred to as a curing agent), and may further contain a thermoplastic resin, a coupling agent, a filler, and the like, as necessary.

As the radical polymerizable material, for example, any material having a functional group which is polymerized by radical can be used without particular limitation. Specific examples of radical polymerizable materials may include an acrylate (including corresponding methacrylate, the same applies hereinafter) compound, an acryloxy (including corresponding methacryloxy, the same applies hereinafter) compound, a maleimide compound, a citraconimide resin, and a nadimide resin. These radical polymerizable materials may be in a state of a monomer or a state of an oligomer, or may be in a mixture state of a monomer and an oligomer.

Examples of an acrylate compound include methyl acrylate, ethyl acrylate, isopropyl acrylate, isobutyl acrylate, ethylene glycol diacrylate, diethylene glycol diacrylate, trimethylolpropane triacrylate, tetramethylolmethane tetraacrylate, 2-hydroxy-1,3-diacryloxypropane, 2,2-bis[4-(acryloxymethoxy)phenyl]propane, 2,2-bis[4-(acryloxypolyethoxy)phenyl]propane, dicyclopentenyl acrylate, tricyclodecanyl acrylate, tris(acryloyloxyethyl)isocyanurate, urethane acrylate, and phosphoric acid ester diacrylate.

A radical polymerizable material such as an acrylate compound may be used together with a polymerization inhibitor such as hydroquinone and methyl ether hydroquinone as necessary. From the viewpoint of improving heat resistance, the radical polymerizable material such as an acrylate compound may have at least one substituent such as a dicyclopentenyl group, a tricyclodecanyl group, and a triazine ring. The radical polymerizable material other than the acrylate compound may be, for example, the compound described in International Publication No. WO 2009/063827. The radical polymerizable materials may be used singly or in combinations of two or more.

As the radical polymerization initiator, for example, any compound capable of decomposing upon heating or irradiation with light to generate radicals can be used without particular limitation. Specific examples of the radical polymerization initiator may include a peroxide compound an azo compound. These compounds are appropriately selected depending on the target connection temperature, connection time, pot life, and the like.

More specific examples of the radical polymerization initiator preferably include diacyl peroxide, peroxy dicarbonate, peroxy ester, peroxy ketal, dialkyl peroxide, hydroperoxide, and silyl peroxide. The radical polymerization initiator may be peroxy ester, dialkyl peroxide, hydroperoxide, and silyl peroxide and the like, and may be peroxy ester from the viewpoint of being capable of obtaining high reactivity. The radical polymerization initiator may be, for example, the compound described in International Publication No. WO 2009/063827. The radical polymerization initiators are used singly or in combinations of two or more.

The content of the radical polymerization initiator may be 0.1 parts by mass or more and may be 10 parts by mass or less, with respect to 100 parts by mass of the total amount of the radical polymerizable material and the thermoplastic resin added as necessary.

The thermoplastic resin which is blended as necessary in the epoxy type adhesive and the radically curable adhesive makes it easy to provide excellent film formability to the adhesive, for example. Examples of the thermoplastic resin include a phenoxy resin, a polyvinyl formal resin, a polystyrene resin, a polyvinyl butyral resin, a polyester resin, a polyamide resin, a xylene resin, a polyurethane resin, a polyester urethane resin, a phenol resin, and a terpene phenol resin. The thermoplastic resin may be, for example, the compound described in International Publication No. WO 2009/063827. The thermoplastic resins may be a phenoxy resin since adhesiveness, compatibility, heat resistance, mechanical strength, and the like are excellent. The thermoplastic resins are used singly or in combinations of two or more.

The content of the thermoplastic resin may be 5 parts by mass or more and may be 80 parts by mass or less, with respect to 100 parts by mass of the total amount of the thermoplastic resin and the thermosetting material when the thermoplastic resin is added to the epoxy type adhesive. The content of the thermoplastic resin may be 5 parts by mass or more and may be 80 parts by mass or less, with respect to 100 parts by mass of the total amount of the thermoplastic resin and the radical polymerizable material when the thermoplastic resin is added to the radically curable adhesive.

Another example of the adhesive component 9 contains a thermal radical curable adhesive containing a thermoplastic resin, a radical polymerizable material in a liquid state at 30° C., and a radical polymerization initiator. The thermal radical curable adhesive has a lower viscosity than the above adhesive component. The content of the radical polymerizable material in the thermal radical curable adhesive may be 20 parts by mass or more, 30 parts by mass or more, or 40 parts by mass or more, and may be 80 parts by mass or less, with respect to 100 parts by mass of the total amount of the thermoplastic resin and the radical polymerizable material.

The adhesive component 9 may be an epoxy type adhesive containing a thermoplastic resin, a thermosetting material including an epoxy resin in a liquid state at 30° C., and a curing agent. In this case, the content of the epoxy resin in the epoxy type adhesive may be 20 parts by mass or more, 30 parts by mass or more, or 40 parts by mass or more, and may be 80 parts by mass or less, with respect to 100 parts by mass of the total amount of the thermoplastic resin and the thermosetting material.

The content of the adhesive component 9 in the adhesive film 3 (the volume proportion of the adhesive component 9 in the adhesive film 3) may be 55% by volume or more or 65% by volume or more, and 95% by volume or less or 85% by volume or less, based on the total volume of the adhesive film 3.

The first conductive particles 10 each exhibit a dendritic shape (also referred to as a dendrite shape) and contain one main shaft and a plurality of branches that two-dimensionally or three-dimensionally branch from the main shaft. The first conductive particles 10 may be formed from a metal such as copper or silver, and may be, for example, a silver-coated copper particle in which a copper particle is coated with silver.

The first conductive particles 10 may be known ones, and specifically are available, for example, as ACBY-2 (Mitsui Mining & Smelting Co., Ltd.), CE-1110 (Fukuda Metal Foil & Powder Co., Ltd.), #FSP (JX Nippon Mining & Metals Corporation), and #51-R (JX Nippon Mining & Metals Corporation). Alternatively, the first conductive particles 10 can also be manufactured by a known method (for example, the method described in International Publication No. WO 2014/021037).

The content of the first conductive particles 10 in the adhesive film 3, based on the total volume of the adhesive film 3, may be 5% by volume or more, 6% by volume or more, 7% by volume or more, 8% by volume or more, 9% by volume or more, or 10% by volume or more, from the viewpoint of further reducing the resistance of the connected body, and may be 30% by volume or less, 25% by volume or less, 22% by volume or less, 20% by volume or less, 18% by volume or less, or 15% by volume or less, from the viewpoint of improving the adhesive strength of the adhesive film.

The second conductive particles 11 each have a non-conductive core and a conductive layer provided on the core. The core is formed from a non-conductive material such as glass, ceramic, and resin, and may be formed from resin. Examples of the resin include an acrylic resin, a styrene resin, a silicone resin, a polybutadiene resin, or copolymers of monomers constituting these resins. The average particle diameter of the core is appropriately selected so that the average particle diameter of the second conductive particles 11 falls within the range described below.

The conductive layer is formed from, for example, gold, silver, copper, nickel, palladium, or an alloy thereof. From the viewpoint of excellent conductivity, the conductive layer may contain at least one selected from gold, nickel, and palladium, may contain gold or palladium, and may contain gold. The conductive layer is formed, for example, by plating the above metal on the core. The thickness of the conductive layer, for example, may be 10 nm or more and may be 400 nm or less.

The average particle diameter of the second conductive particles 11 may be 10 μm or more or 20 μm or more, and may be 25 μm or more, 27 μm or more, or 30 μm or more, from the viewpoint that a conductive path can be suitably formed in the depressed portion 1b of the first electronic member 1 and deterioration of appearance and resistance value can be suppressed even when the connected body is placed under high temperature or low temperature. The average particle diameter of the second conductive particles 11 may be 50 μm or less, 40 μm or less, or 30 μm or less, from the viewpoint that the adhesive film 3 can be suitably made thin. The average particle diameters of the second conductive particles 11 and the core constituting it are measured by a particle size distribution measuring apparatus (Microtrac (product name, Nikkiso Co., Ltd.)) using a laser diffraction-scattering method.

The average particle diameter of the second conductive particles 11 is not less than the depth D of the depressed portion 1b from the viewpoint of obtaining a connected body having excellent appearance and low resistance, and may be more than or equal to 1.1 times, or more than or equal to 1.2 times the depth D of the depressed portion 1b, from the viewpoint of further easily obtaining the effect. The average particle diameter of the second conductive particles 11 may be 5 μm or more, 10 μm or more, or 20 μm or more. The average particle diameter of the second conductive particles 11 may be 100 μm or less, 60 μm or less, or 60 μm or less. From the viewpoint of obtaining the connected body that is excellent in appearance and has low resistance, it may be less than or equal to 2.5 times, less than or equal to 2.0 times, less than or equal to 1.7 times, less than or equal to 1.5 times, less than or equal to 1.4 times, less than or equal to 1.3 times, or less than or equal to 1.2 times the depth D of the depressed portion 1b.

The content of the second conductive particles 11 in the adhesive film 3 (the volume proportion of the second conductive particles 11 in the adhesive film 3) may be 1% by volume or more, 2% by volume or more, 3% by volume or more, or 5% by volume or more, and may be 20% by volume or less, 10% by volume or less, 8% by volume or less, or 5% by volume or less, based on the total volume of the adhesive film 3.

The thickness of the adhesive film 3 may be 15 μm or more, 20 μm or more, 25 μm or more, 30 μm or more, 35 μm or more, or 40 μm or more, from the viewpoint that the depressed portion 1b in the first electronic member 1 can be suitably filled with the adhesive ingredient 9 or the like and deterioration of appearance and resistance value can be suppressed even when the connected body is placed under high temperature or low temperature. From the same viewpoint, the thickness of the adhesive film 3 may be not less than the depth D of the depressed portion 1b, and may be more than or equal to 1.1 times, or more than or equal to 1.2 times the depth D of the depressed portion 1b.

The thickness of the adhesive film 3 may be, for example, 70 μm or less, 60 μm or less, or 50 μm or less. The thickness of the adhesive film 3 may be, for example, less than or equal to 2.5 times or less, less than or equal to 2.0 times or less, less than or equal to 1.7 times or less, or less than or equal to 1.5 times or less the depth D of the depressed portion 1b.

The thickness of the adhesive film 3 may be more than or equal to 1.0 time, more than or equal to 1.1 times, or more than or equal to 1.2 times the average particle diameter of the second conductive particles, and may be less than or equal to 2.0 times, less than or equal to 1.8 times, less than or equal to 1.6 times, less than or equal to 1.5 times, less than or equal to 1.4 times, or less than or equal to 1.3 times the average particle diameter of the second conductive particles, from the viewpoint that the connected body having excellent appearance and low resistance is more easily obtained and deterioration of appearance and resistance value can be suppressed even when the connected body is placed under high temperature or low temperature.

The connecting step contains disposing the adhesive film 3 between the first electronic member 1 and the second electronic member 2, and pressure-bonding the second electronic member 2 to the first electronic member 1. Specifically, the second electronic member 2 is pressurized and heated in the direction indicated by the arrow X in FIG. 1 (the stacking direction of the first electronic member 1, the adhesive film 3, and the second electronic member 2) so that the substantially flat surface 8a of the second electrode 8 is electrically connected to the first electrode 6. The heating temperature, for example, may be 50° C. or higher and may be 190° C. or lower. The pressures, for example, may be 0.1 MPa and may be 30 MPa. The heating and pressurizing time, for example, may be 0.5 seconds or more and may be 120 seconds or less.

As described above, the method of producing the connected body according to one embodiment, is a method containing a step of electrically connecting a first electronic member having a first electrode with a second electronic member having a second electrode via an adhesive film, wherein the first electronic member has an indented surface, the first electrode is provided in a depressed portion of the indented surface, the second electrode is an electrode having a substantially flat surface having an area larger than an area of the first electrode, the adhesive film contains: first conductive particles that are dendritic conductive particles; and second conductive particles that are conductive particles other than the first conductive particles, and each second conductive particle containing a non-conductive core and a conductive layer provided on the core, the second conductive particles have an average particle diameter of not less than a depth of the depressed portion, and the adhesive film is disposed between the first electronic member and the second electronic member, and the second electronic member is pressure-bonded to the first electronic member so that the substantially flat surface of the second electrode is electrically connected to the first electrode, in the step.

The adhesive film according to one embodiment is an adhesive film containing: first conductive particles that are dendritic conductive particles; and second conductive particles that are conductive particles other than the first conductive particles, and each second conductive particle containing a non-conductive core and a conductive layer provided on the core, wherein the adhesive film is used for electrical connection of a first electronic member having a first electrode and a second electronic member having a second electrode, the first electronic member has an indented surface, the first electrode is provided in a depressed portion of the indented surface, the second conductive particles have an average particle diameter of not less than a depth of the depressed portion, the second electrode is an electrode having a substantially flat surface having an area larger than an area of the first electrode, and the substantially flat surface of the second electrode is electrically connected to the first electrode in the electrical connection.

A connected body is obtained by the above producing method. The connected body contains: a first electronic member 1 having a first substrate 4, an insulating layer 5 provided on the first substrate 4, and a first electrode 6; a second electronic member 2 having a second substrate 7 and a second electrode 8 provided on the second substrate 7; and a connecting member electrically connecting the first electrode 6 and the second electrode 8 to each other. The connecting member contains a cured product of the adhesive component 9, and the first conductive particles 10 and the second conductive particles 11 which are dispersed in the cured product. That is, the connecting member is formed by curing the adhesive film 3 described above.

Examples

Hereinafter, the present invention will be described more specifically based on Examples, but the present invention is not limited to the following Examples.

(Preparation of Adhesive Solution)

50 g of a phenoxy resin (product name: PKHC, weight average molecular weight: 45000, manufactured by Union Carbide Corporation) was dissolved in a mixed solvent of toluene (boiling point: 110.6° C.) and ethyl acetate (boiling point: 77.1° C.) (at a mass ratio of toluene:ethyl acetate=1:1) to obtain a phenoxy resin solution having a solid content of 40% by mass. In this phenoxy resin solution, urethane acrylate (product name: UN7700, manufactured by Negami Chemical Industrial Co., Ltd.) and phosphoric acid ester dimethacrylate (product name: Light Ester P-2M, manufactured by Kyoeisha Chemical Co., Ltd.) as a radical polymerizable material, and 1,1-bis(t-hexylperoxy)-3,3,5-trimethylcyclohexane (product name: Perhexa TMH, manufactured by NOF Corporation) as a curing agent were blended at a solid mass ratio of phenoxy resin:urethane acrylate:phosphoric acid ester dimethacrylate:curing agent=10:10:3:2 to obtain an adhesive solution.

(First Conductive Particles)

The dendritic conductive particles (silver-coated copper particles, manufactured by Mitsui Mining & Smelting Co., Ltd., product name: ACBY-2) were used as the first conductive particles.

(Preparation of Second Conductive Particles A)

Benzoyl peroxide as a polymerization initiator was added to a mixed solution of divinylbenzene, styrene monomer, and butyl methacrylate, and polymerization reaction was performed by heating at high speed with uniform stirring to obtain a fine particle dispersion solution. This fine particles dispersion solution was filtered and dried under reduced pressure to obtain a block body which was an aggregate of fine particles. This block body was pulverized to prepare cores (resin particles).

A palladium catalyst (product name: MK-2605, manufactured by Muromachi Technos Co., Ltd.) was supported on the surface of the above cores, and the cores were activated with an accelerator (product name: MK-370, manufactured by Muromachi Technos Co., Ltd.). The cores were added to a mixed solution of nickel sulfate aqueous solution, sodium hypophosphite aqueous solution, and sodium tartrate aqueous solution heated to 60° C. to perform a pre-electroless plating step. The mixture was stirred for 20 minutes, and it was confirmed that hydrogen bubbling stopped. A mixed solution of nickel sulfate, sodium hypophosphite, sodium citrate, and a plating stabilizer was added and stirred until pH was stabilized, and the post-electroless plating step was performed until hydrogen bubbling stopped. Subsequently, the plating solution was filtered, the filtrate was washed with water, and then dried with a vacuum dryer at 80° C. to prepare the second conductive particles a which were nickel-plated. The average particle diameter of the second conductive particles a was 30 μm, and the thickness of the conductive layer was 150 nm (Preparation of Second Conductive Particles B)

Second conductive particles b were obtained in the same manner as the second conductive particles a except that the particle diameter of the cores was changed. The average particle diameter of the second conductive particles b was 20 μm, and the thickness of the conductive layer was 100 nm.

(Preparation of Second Conductive Particles C)

Second conductive particles c were obtained in the same manner as the second conductive particles a except that the particle diameter of the cores was changed. The average particle diameter of the second conductive particles c was 10 μm, and the thickness of the conductive layer was 100 nm.

(Preparation of Second Conductive Particles D)

Second conductive particles d were obtained in the same manner as the second conductive particles a except that the particle diameter of the cores was changed. The average particle diameter of the second conductive particles d was 40 μm, and the thickness of the conductive layer was 100 nm.
(Preparation of Second Conductive Particle E)

Second conductive particles e were obtained in the same manner as the second conductive particle a except that the particle diameter of the cores was changed. The average particle diameter of the second conductive particles e was 60 μm, and the thickness of the conductive layer was 100 nm.
(Preparation of Adhesive Film)

A mixed solution was obtained by dispersing the first conductive particles and the second conductive particles in the above-described adhesive solution so that the contents of the first conductive particles and the second conductive particles in the obtained adhesive film became the amounts shown in Table 1. The obtained mixed solution was applied onto a fluororesin film having a thickness of 80 μm, and the solvent was removed by hot-air drying at 70° C. for 10 minutes to obtain each adhesive film having a thickness shown in Table 1 which was formed on the fluororesin film.

The following evaluations were performed using each adhesive film. The results are shown in Table 1.
[Evaluation of Initial Characteristics]
(Appearance)

Figure 2:
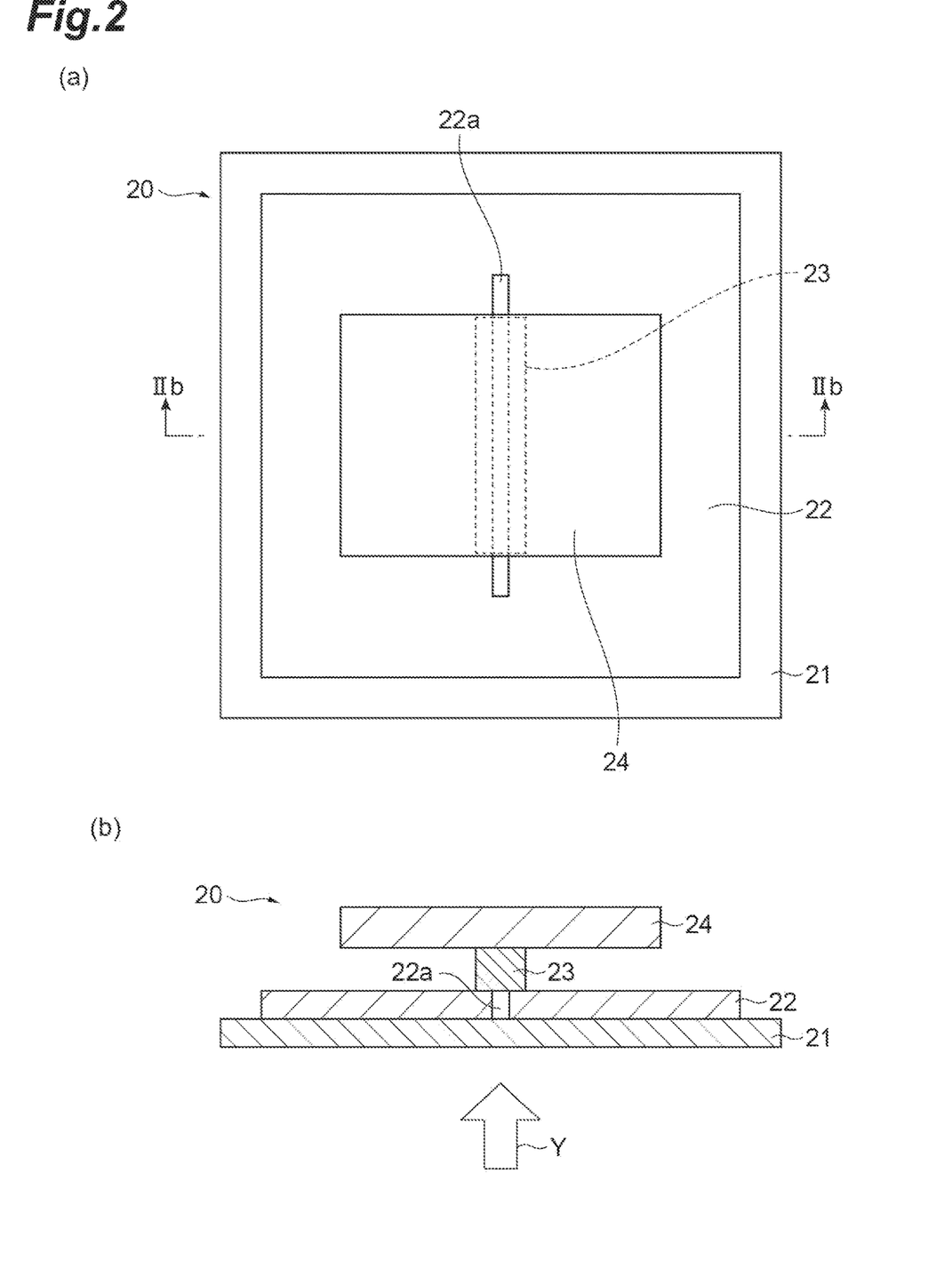
FIG. 2 is a diagram for explaining a method of evaluating an appearance in Examples.

A sample for appearance evaluation 20 as shown in FIG. 2 was prepared. FIG. 2(a) is a top view of the sample for appearance evaluation 20, and FIG. 2(b) is a cross-sectional view taken along line IIb-IIb in FIG. 2(a).

Specifically, first, any one of polyimide films 22 having different thicknesses (size: 26 mm×76 mm, thicknesses: 10 μm, 20 μm, 25 μm, 35 μm, or 50 μm) was placed on a slide glass 21 (size: 1 mm×25 mm, thicknesses: 25 mm). A slit (depressed portion) 22a (size: 20 mm×0.5 mm, depth: 10 μm, 20 μm, 25 μm, 35 μm, or 50 μm) is formed in a substantially central portion of the polyimide film 22. Next, an aluminum foil 24 (size: 15 mm×3 mm, thickness: 25 μm) was connected onto the polyimide film 22 via each of the adhesive films 23 (size: 15 mm×20 mm) obtained above.

For each of the obtained samples for appearance evaluation 20, the slit 22a of the polyimide film 22 was observed with an optical microscope (in a visual field in which the entire slit 22a could be observed) from the slide glass 21 side (in the direction of arrow Y in FIG. 2(b)), and the presence or absence of air bubbles in the slit 22a was observed. The appearance was evaluated as follows according to the presence or absence (number) of bubbles of 50 μm or more. When the evaluation is A or B, the appearance is excellent.

A: no bubbles of φ 50 μm or more
B: one to two bubbles of φ 50 μm or more
C: three or more bubbles of φ 50 μm or more
(Resistance)

Figure 3:
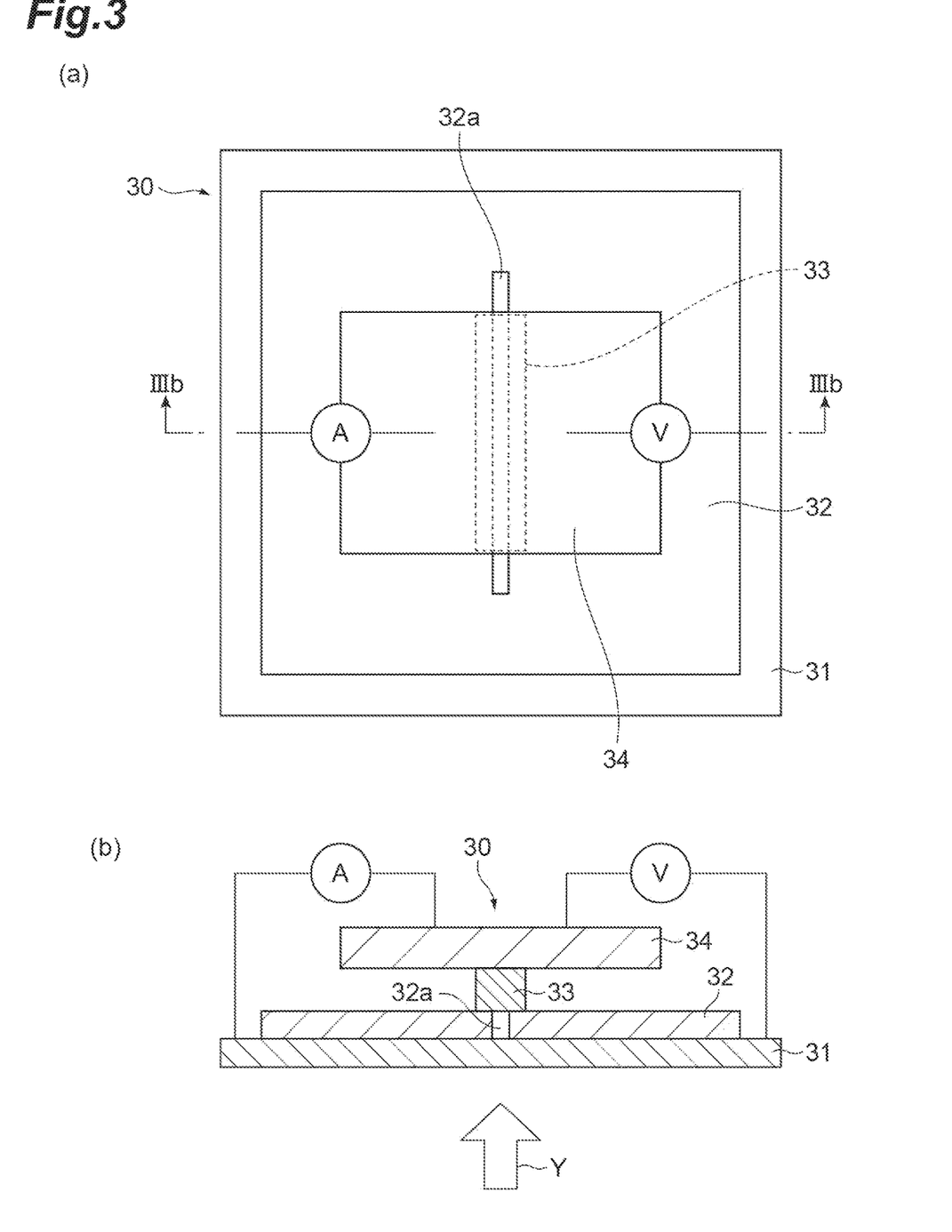
FIG. 3 is a diagram for explaining a method of measuring resistance in Examples.

A sample for resistance measurement 30 as shown in FIG. 3 was produced. FIG. 3(a) is a top view of the sample for resistance measurement 30, and FIG. 3(b) is a cross-sectional view taken along line IIIb-IIIb of FIG. 3(a).

Specifically, first, any one of polyimide films 22 having different thicknesses (size: 35 mm×35 mm, thicknesses: 10 μm, 20 μm, 25 μm, 35 μm, or 50 μm) was placed on a copper foil 31 (size: 25 mm×25 mm, thicknesses: 25 μm). A slit 32a (size: 20 mm×0.5 mm, depth: 10 μm, 20 μm, 25 μm, 35 μm, or 50 μm) is formed in a substantially central portion of the polyimide film 32. Next, an aluminum foil 34 (size: 15 mm×3 mm, thickness: 25 μm) was connected onto the polyimide film 32 via each of the adhesive films 33 (size: 15 mm×20 mm) obtained above.

For each of the obtained samples for resistance measurement 30, the current and voltage between the copper foil 31 and the aluminum foil 34 were measured with an ammeter A and a voltmeter V, respectively, and the resistance value was calculated.
[Evaluation of Characteristics after Cycle Test]

Each of the samples for appearance evaluation 20 and the samples for resistance measurement 30 prepared as described above was subjected to a cycle test in which a heat cycle of holding at −20° C. for 30 minutes, raising the temperature to 100° C. over 10 minutes, holding at 100° C. for 30 minutes, and lowering the temperature to −20° C. over 10 minutes was repeated for 250 cycles using TSA-43EL manufactured by ESPEC. After the cycle test, each of the samples for appearance evaluation 20 and the samples for resistance measurement 30 was subjected to the evaluation of appearance and the measurement of resistance in the same manner as described above.
[Evaluation of Adhesive Strength]

An aluminum foil (size: 40 mm×15 mm, thickness: 25 μm) was connected to a copper foil (size: 15 mm×3 mm, thickness: 25 μm) via each of the adhesive films (size: 15 mm×20 mm) obtained above. Using TENSILON UTM-4 manufactured by Toyo Baldwin Co., Ltd., the adhesive strength of the connected body was measured in accordance with JIS Z0237 by a 90-degree peeling method under conditions of a peeling rate of 50 mm/min and 25° C.

TABLE 1

|  |  | Example | | | | | | | |
|---|---|---|---|---|---|---|---|---|---|
|  |  | 1 | 2 | 3 | 4 | 5 | 6 | 7 | 8 |
| Content of conductive particles (% by volume) | First conductive particles | 8 | 8 | 9 | 7 | 8 | 8 | 8 | 8 |
|  | Second conductive particles a | 2 | — | 3 | 3 | 2 | — | — | 2 |
|  | Second conductive particles b | — | — | — | — | — | 2 | — | — |
|  | Second conductive particles c | — | — | — | — | — | — | 2 | — |
|  | Second conductive particles d | — | 2 | — | — | — | — | — | — |
|  | Second conductive particles e | — | — | — | — | 2 | — | — | — |
| Thickness of adhesive film (mm) | | 35 | 45 | 35 | 35 | 70 | 25 | 15 | 60 |
| Depth of depressed portion (mm) | | 25 | 35 | 25 | 25 | 50 | 20 | 10 | 25 |
| Average particle diameter of second conductive particles (mm) | | 30 | 40 | 30 | 30 | 60 | 20 | 10 | 30 |
| Average particle diameter/Depth | | 1.2 | 1.1 | 1.2 | 1.2 | 1.2 | 1.0 | 1.0 | 1.2 |
| Thickness/Average particle diameter | | 1.2 | 1.1 | 1.2 | 1.2 | 1.2 | 1.3 | 1.5 | 2.0 |
| Initial characteristics | Appearance | A | A | A | A | A | A | A | A |
|  | Resistance (Ω) | 0.02 | 0.02 | 0.017 | 0.021 | 0.023 | 0.028 | 0.023 | 0.022 |
| Characteristics after cycle test | Appearance | A | A | A | A | A | A | A | A |
|  | Resistance (Ω) | 0.44 | 0.5 | 0.44 | 0.44 | 0.42 | 0.5 | 0.4 | 0.43 |

TABLE 1-continued

|  | Example | | | | | | | |
|---|---|---|---|---|---|---|---|---|
|  | 1 | 2 | 3 | 4 | 5 | 6 | 7 | 8 |
| Adhesive strength (N) | 11 | 11 | 11 | 11 | 11 | 11 | 10 | 11 |

TABLE 2

| | | Example | | Comparative Example | | | | | |
|---|---|---|---|---|---|---|---|---|---|
| | | 9 | 10 | 1 | 2 | 3 | 4 | 5 | 6 |
| Content of conductive particles (% by volume) | First conductive particles | 22 | 8 | 8 | 8 | 8 | 8 | 10 | — |
| | Second conductive particles a | 2 | 15 | — | — | — | — | — | 10 |
| | Second conductive particles b | — | — | 2 | 2 | 2 | — | — | — |
| | Second conductive particles c | — | — | — | — | — | 2 | — | — |
| | Second conductive particles d | — | — | — | — | — | — | — | — |
| | Second conductive particles e | — | — | — | — | — | — | — | — |
| Thickness of adhesive film (μm) | | 30 | 30 | 25 | 30 | 40 | 30 | 30 | 30 |
| Depth of depressed portion (μm) | | 25 | 25 | 25 | 25 | 25 | 25 | 25 | 25 |
| Average particle diameter of second conductive particles (μm) | | 30 | 30 | 10 | 10 | 10 | 10 | — | 30 |
| Average particle diameter/Depth | | 1.2 | 1.2 | 0.4 | 0.4 | 0.4 | 0.4 | — | 1.2 |
| Thickness/Average particle diameter | | 1.0 | 1.0 | 2.5 | 3.0 | 4.0 | 3.0 | — | 1.0 |
| Initial characteristics | Appearance | A | A | B | A | A | A | A | A |
| | Resistance (Ω) | 0.015 | 0.017 | 0.041 | 0.05 | 0.065 | 0.08 | 0.2 | 0.1 |
| Characteristics after cycle test | Appearance | A | B | C | B | A | A | B | A |
| | Resistance (Ω) | 0.98 | 0.97 | 3.25 | 3.11 | 1.74 | 1.2 | 1.5 | 1.5 |
| Adhesive strength (N) | | 4 | 4 | 10 | 10 | 11 | 11 | 5 | 8 |

REFERENCE SIGNS LIST

1: first electronic member, 2: second electronic member, 3: adhesive film, 4: first substrate, 5: insulating layer, 6: first electrode, 7: second substrate, 8: second electrode, 10: first conductive particle, 11: second conductive particle.

The invention claimed is:

1. A method of producing a connected body, comprising:
disposing an adhesive film between a first electronic member having a first electrode and a second electronic member having a second electrode; and
pressure-bonding the second electronic member to the first electronic member via the adhesive film so that the second electrode is electrically connected to the first electrode,
wherein
the first electronic member has an indented surface,
the first electrode is provided in a depressed portion of the indented surface, the depressed portion having a depth of 25 μm or more, and
the second electrode is an electrode having a substantially flat surface having an area larger than an area of the first electrode, and
wherein
the adhesive film comprises:
first conductive particles that are dendritic conductive particles; and
second conductive particles that are conductive particles other than the first conductive particles, each second conductive particle comprising a non-conductive core and a conductive layer provided on the core, and
the second conductive particles have an average particle diameter of 25 μm or more and the average particle diameter of the second conductive particles is not less than the depth of the depressed portion.

2. The method according to claim 1, wherein the adhesive film has a thickness of not less than the depth of the depressed portion.

3. The method according to claim 1, wherein the average particle diameter of the second conductive particles is less than or equal to 2.5 times the depth of the depressed portion.

4. The method according to claim 1, wherein the adhesive film has a thickness of between 1.2 times and 2 times the average particle diameter of the second conductive particles.

5. An adhesive film comprising:
first conductive particles that are dendritic conductive particles; and
second conductive particles that are conductive particles other than the first conductive particles, and each second conductive particle comprising a non-conductive core and a conductive layer provided on the core, wherein
the adhesive film is used for electrical connection of a first electronic member having a first electrode and a second electronic member having a second electrode,
the first electronic member has an indented surface,
the first electrode is provided in a depressed portion of the indented surface, the depressed portion having a depth of 25 μm or more,
the second conductive particles have an average particle diameter of 25 μm or more and the average particle diameter of the second conductive particles is not less than the depth of the depressed portion,
the second electrode is an electrode having a substantially flat surface having an area larger than an area of the first electrode, and
the substantially flat surface of the second electrode is electrically connected to the first electrode in the electrical connection.

6. The adhesive film according to claim 5, wherein the adhesive film has a thickness of not less than the depth of the depressed portion.

7. The adhesive film according to claim 5, wherein the average particle diameter of the second conductive particles is less than or equal to 2.5 times the depth of the depressed portion.

8. The adhesive film according to claim 5, wherein the adhesive film has a thickness of between 1.2 times and 2 times the average particle diameter of the second conductive particles.

* * * * *